United States Patent [19]

Anderson et al.

[11] Patent Number: 4,784,687
[45] Date of Patent: Nov. 15, 1988

[54] TUNGSTEN RECOVERY

[75] Inventors: Diana M. Anderson, Sutton Weaver Runcorn; Denis A. Hutton, Sale, both of England

[73] Assignee: Interox Chemicals Limited, London, England

[21] Appl. No.: 840,766

[22] Filed: Mar. 18, 1986

[30] Foreign Application Priority Data

Mar. 29, 1985 [GB] United Kingdom ............... 8508334

[51] Int. Cl.$^4$ ............................................. C22B 34/36
[52] U.S. Cl. .................................... 75/101 R; 75/121; 423/53
[58] Field of Search ............... 423/53, 440; 75/101 R, 75/121

[56] References Cited

U.S. PATENT DOCUMENTS 4,533,527  8/1985  Farrell et al. ................... 423/53

FOREIGN PATENT DOCUMENTS 21991  7/1965  Japan ................................ 423/53

OTHER PUBLICATIONS

Artykbaev et al., "Uzbekskii Khimicheskii Zhurnal", 1979 (2), pp. 31-33 (Translation Cited).

Primary Examiner—Robert L. Stoll
Attorney, Agent, or Firm—Larson and Taylor

[57] ABSTRACT

The scarcity of high grade tungsten ores obliges users to seek to recover it from scrap materials, but drill bits in particular pose especial problems. Existing proposals to use acidic hydrogen peroxide to oxides and solubilize tungsten is extremely inefficient in reagent consumption per unit tungsten recovered.

According to the present invention, hydrogen peroxide can be used considerably more efficiently in the extraction of tungsten into an aqueous acidic solution by employing certain promoters which are solid at 50° C. in the form of fused blocks. These blocks release the promoter slowly into the reaction solution and achieve similar efficiency of use of hydrogen peroxide and acid but at markedly reduced consumption of promoter in comparison with the same promoter added in powder or granular form. Examples of such promoter are hydroxy or amino substituted aromatic carboxylic acids e.g. 2-hydroxybenzoic acid. The promoters can most conveniently be used in a multi-stage tungsten extraction process.

13 Claims, No Drawings

TUNGSTEN RECOVERY

The present invention relates to improvements in a process for the recovery of tungsten and more particularly in improvements in a process employing acidic hydrogen peroxide to recover tungsten from scrap tungsten alloys.

Tungsten is a valuable and useful metal in for example electric light filaments and in drill bits, but high grade ores containing it are comparatively scarce so that there is continuing interest in its recovery from scrap materials. One source of scrap comprises tungsten alloys such as tungsten carbide pieces, each of which on average weigh several grams and are typically several mm such as at least 5 mm in size, many are 1 or 2 cm in size and some are even up to 10 cm in size. The tungsten carbide is often cemented with other metals such as cobalt, and can contain minor fractions of other metals such as titanium and tantalum typically often present as the respective carbides. The pieces can also be coated with a thin layer of, for example aluminium nitride or niobium or titanium or tantalum compounds. Both pyrometallurgical and hydrometallurgical methods have been suggested for recovering tungsten from scrap pieces, but the former methods currently suffer from the increased cost of energy in recent years, and the aforementioned coatings can interfere with tungsten recovery disproportionately. Other tungsten alloys that can be treated according to the present invention in piece form can contain significant proportions of copper, nickel and cobalt and minor amounts of group IVB and VB metals including titanium, tantalum, niobium and zirconium. A characteristic of tungsten alloy scrap pieces is that virtually none of the metal can be leached out using a mineral acid solution free from added oxidant.

Disintegration of drill-type tungsten/cobalt alloy scrap using a hydrochloric acid solution of hydrogen peroxide has already been suggested by Toyo Soda in Japanese Patent Application Publication 1977-13408 which resulted in the leaching of the cobalt into solution and the disintegration of the resultant mass into a tungsten-containing powder. However, the problem still remains of recovering tungsten from the powder so that this disclosure represents only a partial solution to the problem of tungsten recovery.

In one other patent, Shwayder in U.S. Pat. No. 3,438,730, has advocated the use of phosphoric acid solution to disintegrate carbide masses, and once again he is producing a powder of tungsten carbide rather than extracting the tungsten into solution. In one comparison, he uses a mixture of hydrochloric acid and hydrogen peroxide, with at best 13.5% wt recovery. Even if that statement implied recovery into solution, which from the context is doubtful, it does not form the basis for a viable process for extracting tungsten from its scrap.

A different teaching is given in Japanese Patent Publication No. 50-21991 by Applied Science Research Institute Foundation, who suggest that tungsten itself can be recovered from tungsten scrap pieces by contacting them with an aqueous acidic solution of hydrogen peroxide having a certain range of compositions and under certain temperature conditions. The specification omits key details such as the relative amounts of solution and tungsten-lumps to use from the generalised description and from Examples of Accomplishment 1 to 3. In Examples of Accomplishment 4, the relative amounts of alloy and solution were stated, but both the concentration of hydrogen peroxide and the extent of dissolution of tungsten (as contrasted with the extent of recovery of tungsten from solution) are omitted. In consequence, the efficiency of use of the reagents can be determined only by repeat trials and can in no way be inferred from the specification itself. The credibility of the specification is further impaired by a significant internal inconsistency between the solution compositions stated generally in the text and that used in Example of Accomplishment 4, an inconsistency that has been resolved only by assuming that the compositions should be expressed as weight % rather than mol. %. There is naturally a presumption that if a document incorrectly states such a fundamental property as how much to use, little trust can be placed in any of its other assertions.

When the method of Japanese Patent Publication No. 50-21991 is applied to extracting tungsten from tungsten carbide-containing lumps in so far as the method can be ascertained, in repeat trials carried out prior to the making of the present invention, it was confirmed that some tungsten did indeed pass into solution, the extent being greater than in the absence of hydrogen peroxide. However, the extent of tungsten dissolution was poor and therefore very inefficient as regards $H_2O_2$ utilisation even if the solution and lumps were kept in contact until all the substantial excess of hydrogen peroxide had been consumed. It was concluded that a substantial improvement in extent of tungsten dissolution would be needed before the method disclosed in principle in this patent publication could be regarded as industrially applicable. It was further concluded by comparison from both these and other trials that it was considerably more difficult to extract tungsten from tungsten alloy lumps such as drill bits than from fine powder obtained by grinding the lumps beforehand as evidenced by the comparative rates and extent of tungsten dissolution from the two forms of material. Moreover, it is usually possible to extract a substantial proportion of the other elements such as Co, Ni or Cu from powdered tungsten alloys, using a mineral acid solution free from added oxidant whereas this is not the case for tungsten alloy pieces. Accordingly, any assertions made concerning extraction from powders cannot be applied unquestioningly to lumps. Of course successful improvement to the extraction from lumps of material would be beneficial by avoiding the stage of grinding an extremely tough material.

It is an object of the present invention to improve the efficiency of utilisation of the reagents in a process for recovering tungsten from tungsten alloy-containing pieces in which tungsten is dissolved into an aqueous acidic hydrogen peroxide solution. According to the present invention there is provided a process for the recovery of tungsten from pieces of tungsten alloy-containing material in which the pieces are contacted with an aqueous acidic solution of hydrogen peroxide at a temperature maintained at from 10° C. to 50° C. until at least some tungsten has passed into solution, which process is characterised by contacting the aqueous solution with a fused block of a promotor selected from:

(a)

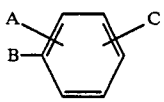

in which A is an hydroxyl or amine substituent and B is selected from carboxylic acid, and aldoxime groups and C an optional further substituent selected from alkyl, hydroxyl and amino groups (b) amino phenols, 1,4-benzoquinone and dihydroquinone (c) 1,3-dinitrobenzene acid (d) oxalic, epoxysuccinic and tartaric acids, which promoters are solid at 50° C., whereby a promotional amount of the promoter passes into solution.

Whilst it will be recognised that many of the foregoing offer a pair of nitrogen or oxygen atoms that can chelate with the tungsten atom to form a complex, the mere existence of such a pair of suitably spaced N or O atoms is by no means sufficient as a means of distinguishing promoters from non-promoter additives. Thus, by way of example there are many compounds that are akin to the foregoing promoters and yet do not themselves promote, such as glycolic and citric acids. Moreover, long known transition metal chelating agents such as ethylene diamine tetraacetic acid and amino tri(methylene phosphonic acid) either show no promotional effect or actually impair the rate and/or extent of tungsten dissolution. This aspect of the instant invention is not predicated upon the following explanation which is given for illumination only. It is considered possible or even likely that at some stage during the extraction of tungsten into solution as a peroxy-complex, a complex is formed that does contain the promoter. The complex then further reacts in the case of certain compounds releasing the promoter to complex with fresh tungsten. However, for other compounds, no significant extent of complex formation occurs, and for yet others the complex formed is such that further reaction is inhibited. This explanation is consistent with the fact that some hydroxy carboxylic acids promote whereas others do not, and also the fact that some compounds known to stabilise hydrogen peroxide in acidic conditions, namely phenol, promote, whereas others, equally well known such as adipic acid if anything impair tungsten dissolution.

From the foregoing promoters it is especially desirable to select as promoter compounds from categories (a) and (b) and especially compounds from category (a) in which an acid group, be it carboxylic acid or sulphonic acid group is ortho or para to an hydroxyl or amino group. Within that sub-category are found salicylic acid (2-hydroxybenzoic acid), anthranilic acid (2-aminobenzoic acid), 4-hydroxy benzoic acid and 4-hydroxy benzene sulphonic acid, for the twin reasons that all are amongst the most effective promoters tested in the course of investigating the instant invention and advantageously do not form insoluble calcium salts that interfere significantly with subsequent processing of the tungsten solution to generate synthetic scheelite.

In copending Application Ser. No. 840,765, entitled "Improvements in Tungsten Recovery", it is stated that when the promoter is introduced in the form of granules or powders, the amount of promoter to employ is usually at least 1 g per kilogram of tungsten alloy pieces and often at least 4 g per kg of pieces. Extremely good results have been obtained in the region of 8 to 32 g/kg alloy pieces. Selection of optimal conditions in many instances occurs by balancing the extent of gain in tungsten recovery against the cost of any marginal increase or decrease in promoter:alloy pieces weight ratio. Amounts in excess of 32 g/kg can be used if desired, such as up to 50 g or even up to 100 g/kg of alloy pieces. It is preferable for promoter to be introduced into every stage, should a multi-stage process be used. In many instances, the total amount of promoter added is from 80 to 160 g per kilogram of alloy pieces, when a multi-stage process in excess of 4 stages is employed.

Recovery for reuse of the promoter from pregnant tungsten solution presents practical difficulties so that it would be of economic benefit to minimise the amount of promoter consumed per unit of tungsten extracted. It has also been found that a saving in the consumption of any promoter that is solid at 50° C. can be made according to the present invention process without marked impairment in promotional effect by introducing it in the form of a fused body of material which presents a markedly lower ratio of surface area to volume, and maintaining in that form during the tungsten dissolution process. The fused block can be held in a porous container or affixed to some surface in the reaction vessel, most advantageously positioned so that the liquor washes over the block, but the agitator does not disintegrate the block. When such a fused block is used, the amount consumed seems substantially self-regulatory, the overall consumption generally falling in the range of 5 to 30 g promoter per kilogram alloy, i.e. often less than 20% of the amount that would be consumed if the same promoter had been introduced in powder or granular form. Thus, perhaps the most acceptable promoters are salicylic acid and anthranilic acid because they are not only solids but also amongst the best promoters.

The block of promoter is normally considerably larger than the pieces of tungsten carbide when it is first employed although, naturally as it is consumed it will grow progressively smaller. It is desirable to produce blocks weighing at least 30 g. A convenient weight of promoter to be present in the form of block or blocks, is often from 50 to 1200 g, and particularly 75 to 300 g per 1000 alloy pieces. Such amounts will permit a considerable weight of tungsten to be dissolved before the blocks need to be replaced or supplemented with fresh blocks.

According to one preferred method of carrying out the present invention, the pieces are contacted with the aqueous acidic solution of hydrogen peroxide in a plurality of consecutive stages, each stage comprising the steps of contacting the pieces with a portion of the solution containing a substoichiometric amount of hydrogen peroxide maintaining contact until a substantial proportion of the free hydrogen peroxide content in the solution has been consumed and thereafter separating the tungsten-enriched solution from the solid residue.

By so doing, the amount of tungsten that can be extracted using a given amount of hydrogen peroxide and mineral acid under otherwise identical operating conditions can be increased beyond that obtainable in a single stage, the improvement increasing as the number of stages is increased. Whilst the major part of the benefit will usually be taken in the form of increased tungsten dissolution, some can, if desired, be taken in the form of a decreased overall amount of hydrogen peroxide or possibly mineral acid being employed. The division between the two ways of reaping the benefit is at the discretion of the user.

Although some gain is achieved using two stages instead of a single stage, it is advantageous to use at least 4 stages. In practice, it is often convenient to restrict the number of stages to no more than 25 stages and a substantial fraction of the gain can be achieved with no more than 15 stages. A balance between the increased overall duration of the multi-stage process and increased gain is often struck by selecting a number of stages in the range of 6 to 12. It will be further recognised that where, for example 10 stages have been selected the user can terminate the process after a lesser number of stages such as 8 or 9, should he so desire and still retain a substantial proportion of the expected gain.

It is believed that tungsten is oxidised and then enters solution in the form of one or more aquated peroxide complexes. The precise form of the peroxidic species is not known, but it has been postulated that the eventually produced predominant species may have the formula $(W_2O_3(O_2).2H_2O)_2$, which requires 5 ½ moles $H_2O_2$ per mole tungsten. Other species postulated include mineral acid residues within the complexes. Consequently, herein, for the avoidance of uncertainty, the term stoichiometric amount of hydrogen peroxide means 1 part by weight $H_2O_2$ (as 100%) per part by weight of tungsten carbide pieces, or the corresponding 5.5:1 mole ratio for other tungsten alloys and corresponds to an $H_2O_2$ Index value of 1.

The gain is maximised by maintaining contact between tungsten alloy pieces and aqueous solution until all free hydrogen peroxide has been consumed and thereafter separating solution from residue without delay or at least without inordinate delay, so as to minimise the likelihood of the peroxy species decomposing and thus lose tungsten from solution. Accordingly, it is preferable for the free hydrogen peroxide content of the solution to be monitored. By way of example, samples can be withdrawn at predetermined intervals either manually or automatically and analysed for free peroxide using a known titration technique employing potassium permanganate and a ferroin indicator or otherwise. Naturally, the frequency of the sampling can be higher or increased as the free hydrogen peroxide content approaches zero. Alternatively, after an initial assessment of the optimum contact period by rigorous monitoring, subsequent stages can employ the same period provided that they operate under the same conditions and the gain will be achieved nearly in full.

The proportion of solution used in each stage need not always be the same, and indeed may deliberately be different where it is desired to match contact time to a range of varying working periods, but under most circumstances it is most convenient for the portions to be substantially the same in each stage. By employing the same sized portions, each stage lasts approximately the same length of time and the operation is thereby simplified. It will be appreciated that the division into equal sized portions of the solution need not be viewed with mathematical precision but instead, some latitude can be tolerated.

In one method of operation, each batch of tungsten alloy scrap pieces is contacted in successive stages with portions of solution until a desired amount of tungsten has been extracted. In a preferred variation, the weight of scrap dissolved in each stage is replenished with fresh scrap before the next stage, so that in every stage the same weight of scrap contacts the selected proportion of solution, combining the advantages of stage-wise solution contact with steady state addition conditions.

Within the temperature range for carrying out the reaction, it is preferable to maintain a temperature of at least 25° C. and conveniently up to 40° C. This is readily obtained by cooling the aqueous solution which tends otherwise to increase in temperature as a result of the exothermic oxidation of decomposition reactions involving hydrogen peroxide. Convenient arrangements to effect cooling include pumping the solution in a loop through a heat exchanger or carrying out the reaction in an agitated vessel equipped with a cooling jacket or cooling coils.

The mineral acid employed in the aqueous solution can be selected from hydrochloric, nitric or sulphuric acids. The improvement by employing the invention procedure is apparent using all three acids. In the event that it is desired subsequently to recover tungsten in solid form from the aqueous solution thereof it is preferable to select nitric acid solutions since they combine excellent tungsten dissolution with the possibility of scheelite precipitation subsequently. Use of sulphuric acid is recommended for use in processes in which the tungsten is to be recovered by boiling the liquor with precipitation of tungsten trioxide.

The concentration of mineral acid employed is more conveniently calculated as a function of the weight of the tungsten alloy scrap. As a generalisation, the extent of tungsten extracted into solution tends to increase up to a maximum as the relative amount of acid is increased until a point is reached at which any gain is minimal. That point varies in line with the proportion of other metals in the alloy and particularly cobalt, copper, nickel, tantalum and titanium. In addition, the amount of acid employed can depend also upon the nature of the scrap. Thus, in respect of tungsten alloy scrap, the amount of acid is often selected in the range of 0.2 to 3.0 parts by weight of nitric or sulphuric acid per part by weight of scrap, or from 0.05 to 0.4 parts of hydrochloric acid per part by weight of scrap. It is particularly suitable to use in total about 0.9 to 1.2 parts by weight of nitric or sulphuric acid per part by weight of tungsten carbide scrap where the other metals comprise about 7–15% w/w thereof. Where each stage uses approximately the same reagent quantities, this latter range converts, for example in the case of 8 stages to using about 0.11 to 0.15 parts by weight of acid per stage per part by weight of scrap. At 20–25% w/w other metal content the corresponding preferred amount is 1.8 to 2.2 parts by weight of sulphuric or nitric acids. The acid itself can be added in any conveniently available concentration, and preferably at least 1 molar. Nitric acid is often employed at 20 to 70% w/w concentration prior to its dilution with aqueous hydrogen peroxide. However, for non-carbide tungsten alloy scrap, the amount of acid used is often in the region of at least 0.2 parts by weight per part of scrap, and in many instances up to 2 parts by weight, for any of the mineral acids.

Hydrogen peroxide is normally employed in an amount of, in total, at least 1.2 parts per part weight/weight of scrap, often up to 2.5 parts per part scrap and in many instances from 1.5 to 2 parts per part scrap. Amounts in excess of this may be used, if desired, but the benefit has not been found to match the increased reagent expenditure, since it is not readily practicable to recirculate any solution from which tungsten has been recovered whilst retaining any residual hydrogen peroxide.

The previously mentioned references with regard to multi-stage operation of the extraction process may be employed in conjunction with promoter addition in block form. One side effect of the promoter addition is that the benefit can be at least partially obtained by reducing the total amount of hydrogen peroxide added by an appreciable proportion, such as up to 15% of the amount in a promoter-free system. One way of achieving that is to reduce the number of stages used such as by one stage to achieve a given tungsten recovery, for example from 8 stages to 7 stages but otherwise employed the $H_2O_2$ and acid concentrations that were applicable to the higher number of stages. This not only saves reagent costs but reduces manpower and other operational costs per unit of tungsten recovered. A further way of likewise saving hydrogen peroxide which is probably the most expensive reagent in the system, is to employ it at a lower weight ratio to WC per stage whilst retaining the acid level at or similar to that which would be used without the promoter.

It can be convenient, though not necessary, to subject the pieces to a pretreatment with a mineral acid solution which contains either nil or very little hydrogen peroxide, such as markedly less $H_2O_2$ than would be introduced in any stage of for example an 8 stage process. The amount of $H_2O_2$ in the pretreatment stage is thus usually up to 50 g $H_2O_2$ per 1000 g tungsten alloy pieces. The acid concentration since it is present mainly to extract metals like cobalt is typically up to 150 g per 1000 g tungsten alloy pieces. Such an acid pretreatment can be especially desirable when the subsequent extraction process uses nitric acid.

Conditions for recovery of tungsten from a mineral acid solution are known in themselves. If the extraction process employed as an additive tartaric or oxalic acid, and/or sulphuric acid as the mineral acid it is necessary to recover tungsten solid as tungstic acid ($WO_3$) by concentrating the acid solution with precipitation of tungstic acid therefrom. Where no additive is added or where the additive did not interfere, it is preferable to recover the tungsten in solid form as synthetic scheelite by adding soda-alkali to the solution, thereby obtaining an insoluble cobalt oxide residue which is separated off and then adding soluble calcium to the cobalt-barren solution, with the result that insoluble calcium tungstate precipitates. The scheelite route advantageously also separates the titanium and tantalum to a very great extent from the tungsten. To effect similar separation of titanium and tantalum from tungstic acid it is necessary to redissolve the acid in soda or ammonia solution and thereafter precipitate scheelite.

The tungsten carbide pieces that can advantageously be used in the instant invention are typically sintered tungsten carbide pieces, which have been bound with cobalt and may contain a minor amount of tantalum and titanium and can also contain trace amounts of one or more other metals such as iron, niobium, zirconium, rubidium and cerium. The pieces can also be coated with aluminium nitride or tantalum or niobium or titanium compounds. Advantageously, such pieces can be used without being crushed or ground.

Conveniently, the present invention can employ concentrated hydrogen peroxide solutions commercially available, such as 35 to 70% w/w solutions stabilised with conventional amounts of sodium stannate and pyrophosphate and/or metal ion sequestering stabilisers such as polyphosphonic acids available for example under the Trade Mark DEQUEST 2000, 2010, 2040 or 2060. When the alloy contains a metal such as copper that is recognised as a strong decomposition catalyst for $H_2O_2$ in acidic solution, it is especially preferable to include a sequestrant or chelator for that metal so as to reduce its destructive impact. This may be effected by adding known sequestrants or by selecting as all or part of the promoter those compounds which sequester copper better, such as 4-hydroxybenzoic acid.

Having described the invention in general terms, specific embodiments will be given now in greater detail by way of example only.

In the subsequent Examples/Comparisons the tungsten carbide pieces had the following approximate analysis:

| | |
|---|---|
| $Al_2O_3$ | 2.2% |
| $SiO_2$ | 1.3 |
| $SO_3$ | 1.0 |
| Cl | 0.5 |
| $TiO_2$ | 2.8 |
| $Fe_2O_3$ | 0.2 |
| CoO | 5.8 |
| $Ta_2O_5$ | 3.4 |
| $WO_3$ | 80.6 |
| $ZrO_2$ | 0.5 |
| $Nb_2O_3$ | 0.8 |
| CaO | 0.1 |
| $Rb_2O$ | 0.1 |
| $CeO_2$ | 0.1 |

Comparisons A and B and Example 1

In Comparison B and the Example, the tungsten carbide pieces were contacted in each stage with an aqueous solution of hydrogen peroxide in an amount of 250 g $H_2O_2$ per 1000 g WC pieces, at a temperature maintained at about 35° C. by water-cooling the reaction vessel and in the presence of a promoter, 2-hydroxybenzoic acid. In Comparison B the weight of promoter per stage was 15 g per 1000 g WC pieces and in the Example the promoter was added as 50–60 g block fused onto a glass rod. In all of the foregoing 400 g of WC pieces were employed in the stage.

In Comparison A, no promoter was present, the amount of acid was 183 $HNO_3$ per 100 g WC pieces per stage, but otherwise was the same as Comparison B.

The concentration of $H_2O_2$ in the extracting solution was monitored periodically by a standardised potassium permanganate titration on a small sample and when no residual $H_2O_2$ was detected, the pregnant liquor was separated from any residual solids and analysed by X-ray fluorescence techniques, and by comparison the % tungsten extraction was calculated. The weight of solids was measured before and after the extraction as a check.

In the Examples, the weight of the fused block was measured before and after each stage of the extraction in order to determine the amount consumed. The figure given for % tungsten extraction is the ratio of tungsten extracted over the amount that theoretically would be extracted if each stage extracted one eighth in the eight stage process, expressed as a percentage. The same procedure was carried out using both fresh WC pieces and pieces that had already been subjected to a partial W extraction. It was found that although the block contained over 50 g promoter, the amount consumed each stage varied within the range of 0.65 to 2.3 g per stage, whereas the tungsten extraction ranged from 98 to 107%, average 102% standard deviation 3%. There was some correlation between the higher consumptions and higher extractions within these ranges.

In Comparison A, 72% tungsten was extracted and in Comparison B, 94% was extracted.

It will therefore be seen that the Examples extracted at least as much tungsten as Comparison B, but at a promoter consumption which averaged around a quarter of the promoter consumption in Comparison B.

EXAMPLES 2 TO 6

In these Examples, the procedure of Example 1 was adopted, but after each stage the weight of tungsten carbide process was restored to its starting amount, 400 g. In Examples 3 to 6 the amount of hydrogen peroxide introduced per stage was reduced as shown in The Table. In each Example at least 4 stages were carried out and the results averaged. For purposes of comparison, the consumption of hydrogen peroxide per unit weight of tungsten extracted is shown, as $H_2O_2$ Index - the lower it is, the more efficiently is $H_2O_2$ being employed. It will be recognised that each Index unit represents a stoichiometric amount of $H_2O_2$.

TABLE 1

| Example No. | Weight (g) of $H_2O_2$ added | Average Weight W dissolved (g) | $H_2O_2$ Index |
|---|---|---|---|
| 2 | 50 | 50.2 | 1.99 |
| 3 | 47.5 | 49.1 | 1.93 |
| 4 | 45 | 47.3 | 1.90 |
| 5 | 42.5 | 45.9 | 1.85 |
| 6 | 40 | 43.8 | 1.83 |

From Table 1, it can be seen that the actual amount of tungsten dissolved per stage falls as the amount of $H_2O_2$ present per stage falls, but that its Index is becoming more favourable simultaneously, i.e. the same amount of $H_2O_2$ in Example 6 dissolved more tungsten than in Example 2. To put these figures in their proper perspective, the Index figure for a single stage comparative process not employing any promoter is 8.3.

EXAMPLES 7 TO 10

In these Examples, the mineral acid used was sulphuric acid at 1.2 g conc $H_2SO_4$ (98% w/w) per g WC pieces instead of nitric acid, but otherwise the general procedure followed was as per Example 1 Example 7 and with reduced $H_2O_2$ additions per stage in Examples 8 to 10 as shown in Table 2. Thus, all these Examples employed a procedure in which 8 stages would theoretically extract all the tungsten and salicylic acid was present as promoter in the form of a fused immobile block. Examples 7 and 8 represent respectively averages of several sets each of 4 stages, each stage operating on the residue from the preceding stage whilst Examples 9 and 10 are results of a single set each of 4 stages. On average only 0.3 g promoter was consumed per stage, i.e. about 0.8% w/w of the tungsten carbide pieces.

The reaction time for each stage was found to be 8 hours for Example 7 and at least 9 hours for the other Examples.

TABLE 2

| Example | Amount of $H_2O_2$ (g) per stage | Amount W (g) dissolved (av) per stage | $H_2O_2$ Index |
|---|---|---|---|
| 7 | 50 | 57.1 | 1.75 |
| 8 | 40 | 55.2 | 1.45 |
| 9 | 37.5 | 53.0 | 1.42 |
| 10 | 35 | 45.0 | 1.56 |

From Table 2, it can be seen that an 8 stage process using a sulphuric acid/$H_2O_2$ system in the presence of a fused block promoter is extremely efficient at use of $H_2O_2$. Thus, at best it was capable extracting tungsten from pieces at a consumption of only 1.42 g $H_2O_2$ per g tungsten extracted.

EXAMPLES 11 AND 12

In these Examples the procedure of Example 10 was repeated but using respectively double and quadruple amounts of acid and $H_2O_2$ per stage, i.e. effectively employing a 4 stage or 2 stage process instead of an 8 stage process.

TABLE 3

| Example | Amount of $H_2O_2$ (g) per stage | Amount W (g) dissolved (av) per stage | $H_2O_2$ Index |
|---|---|---|---|
| 11 | 75 | 92.6 | 1.62 |
| 12 | 150 | 152 | 1.97 |

From Table 3, it can be seen that exactly as in the nitric acid system the efficiency of use of $H_2O_2$ was best when the largest number of stages was used in the presence of the fused block promoter. The reduction in stages from 8 to 4 was similar in effect to the removal of promoter from the 8 stage system in terms of change in the $H_2O_2$ Index.

We claim:

1. In a process for the recovery of tungsten from pieces of tungsten alloy-containing material of at least 5 mm in size in which the pieces are contacted with an aqueous mineral acid solution of hydrogen peroxide at a temperature maintained at from 10° C. to 50° C. until at least some tungsten has passed into solution, the improvement which comprises contacting the aqueous acidic solution with a fused block weighing at least 30 grams of a promoter selected from the group consisting of:

(a) a compound having the formula:

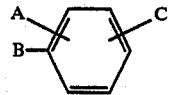

wherein A is a hydroxyl or an amine substituent, B is a carboxylic acid or an aldoxime group, and C is an optional further substituent selected from the group consisting of alkyl, hydroxyl, and amino groups;
(b) amino phenol;
(c) 1,4-benzoquinone;
(d) dihydroquinone;
(e) 1,3-dinitrobenzene acid;
(f) oxalic acid;
(g) epoxysuccinic acid; and
(h) tartaric acid;
said promoters being solid at 50° C., whereby consumption of the promoter is less than the amount that would be consumed if the same amount of promoter had been introduced in powder or granular form, under otherwise identical process conditions.

2. A process according to claim 1 wherein the pieces of tungsten alloy-containing material are contacted with the aqueous acidic solution in a plurality of consecutive stages, each stage comprising the steps of contacting the pieces with a portion of the solution containing a substoichiometric amount of hydrogen peroxide, maintaining contact until a substantial proportion of the free hydrogen peroxide content in the solution has been consumed, and thereafter separating the tungsten-enriched solution from the solid residue, whereby the amount of tungsten that is extracted using a given amount of hydrogen peroxide and mineral acid under otherwise identical operating conditions is increased beyond that obtainable in a single stage.

3. A process according to claim 1 wherein the promoter is 2-hydroxybenzoic acid or 4-hydroxybenzoic acid.

4. A process according to claim 1 wherein the promoter is epoxysuccinic acid or tartaric acid.

5. A process according to claim 1 wherein the total amount of hydrogen peroxide introduced is from 1.5 to 2 parts w/w per part of tungsten alloy pieces.

6. A process according to claim 2 wherein the number of stages is from 4 to 25.

7. A process according to claim 6 wherein the number of stages is from 6 to 12.

8. A process according to claim 1 wherein the tungsten alloy-containing material comprises tungsten carbide.

9. A process according to claim 8 wherein the total amount of acid employed is from 0.5 to 2 parts w/w nitric or sulphuric acid or 0.5 to 0.4 parts w/w hydrochloric acid per part of tungsten carbide pieces.

10. A process according to claim 8 wherein the total amount of nitric or sulphuric acid employed is from 0.9 to 1.2 parts w/w per part of tungsten carbide pieces.

11. A process according to claim 1 wherein the reaction temperature is maintained in the range of 25° to 40° C.

12. A process according to claim 2 wherein the amount of promoter employed per stage is at least 1 part per 1000 parts w/w of tungsten alloy-containing material pieces.

13. A process according to claim 2 wherein the amount of tungsten alloy extracted into solution in one stage is replenished with fresh alloy prior to the next stage so that thereby the weight ratio of alloy to solution is approximately the same in every stage.

* * * * *